(12) United States Patent
Mozes et al.

(10) Patent No.: US 12,491,033 B2
(45) Date of Patent: Dec. 9, 2025

(54) SPLINT DEVICE FORMING A FIDUCIAL MARKER CO- OPERABLE WITH A GUIDANCE SYSTEM OF A ROBOT

(71) Applicant: NEOCIS INC., Miami, FL (US)

(72) Inventors: Alon Mozes, Miami Beach, FL (US); Uday Reebye, Durham, NC (US); Juan Salcedo, Coral Gables, FL (US); Mauro Fittipaldi, Miami, FL (US)

(73) Assignee: NEOCIS INC., Miami, FL (US)

( * ) Notice: Subject to any disclaimer, the term of this patent is extended or adjusted under 35 U.S.C. 154(b) by 495 days.

(21) Appl. No.: 17/629,081

(22) PCT Filed: Jul. 23, 2020

(86) PCT No.: PCT/IB2020/056977
§ 371 (c)(1),
(2) Date: Jan. 21, 2022

(87) PCT Pub. No.: WO2021/014408
PCT Pub. Date: Jan. 28, 2021

(65) Prior Publication Data
US 2022/0233248 A1    Jul. 28, 2022

Related U.S. Application Data

(60) Provisional application No. 62/878,240, filed on Jul. 24, 2019.

(51) Int. Cl.
*A61B 34/20* (2016.01)
*A61B 17/00* (2006.01)
(Continued)

(52) U.S. Cl.
CPC .............. *A61B 34/20* (2016.02); *A61B 17/02* (2013.01); *A61B 17/24* (2013.01); *A61B 34/30* (2016.02);
(Continued)

(58) Field of Classification Search
CPC . A61B 2034/2055; A61B 34/20; A61B 34/30; A61B 90/39; A61B 17/02;
(Continued)

(56) References Cited

U.S. PATENT DOCUMENTS 6,244,866 B1    6/2001  Campbell
2003/0134253 A1    7/2003  Hirsch et al.
(Continued)

FOREIGN PATENT DOCUMENTS

EP           2 491 901        8/2012
WO      WO 02/096261       12/2002
(Continued)

*Primary Examiner* — Eric J Rosen
*Assistant Examiner* — Sydney J Pulvidente
(74) *Attorney, Agent, or Firm* — Womble Bond Dickinson (US) LLP

(57) ABSTRACT

A splint device (100) co-operable with a guidance system of a robot is provided. In some aspects, a splint body (200) is fixedly coupled to a first object (102) disposed within a pliable housing (104) defining an opening. The splint body includes a laterally-extending medial portion (202) having opposed lateral sides (204, 206), and first and second stabilizing portions (208, 210) extending therefrom and extending about and affixed to the first object. In some aspects, the splint body includes a retractor (300) having a first portion (302) coupled to the splint body, and a second portion (304) extending away from the splint body and engaging the pliable housing about the opening to retract and maintain the pliable housing away from the first object, such that the first object is accessible through the opening, and/or a spacer (400) engaged with the splint body and cooperating with the splint body to separate a second object (106) from the first object within the pliable housing.

10 Claims, 6 Drawing Sheets

Figure 1:
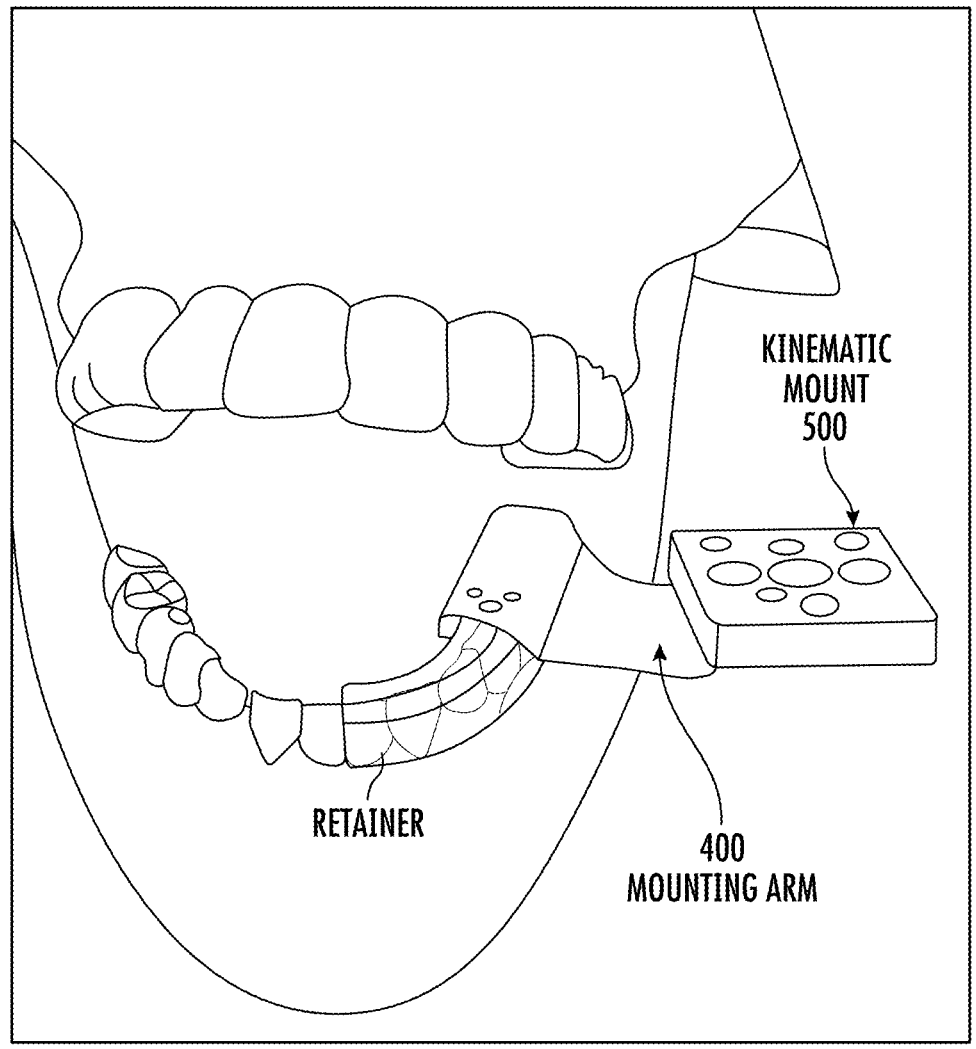

(51) Int. Cl.
- *A61B 17/02* (2006.01)
- *A61B 17/24* (2006.01)
- *A61B 34/30* (2016.01)
- *A61B 90/00* (2016.01)
- *A61C 1/08* (2006.01)

(52) U.S. Cl.
CPC .............. *A61B 90/39* (2016.02); *A61C 1/082* (2013.01); *A61B 2017/00407* (2013.01); *A61B 2034/2055* (2016.02); *A61B 2034/2068* (2016.02); *A61B 2090/3983* (2016.02); *A61B 2090/3991* (2016.02)

(58) Field of Classification Search
CPC ............ A61B 17/24; A61B 2034/2068; A61B 2090/3983; A61B 2090/3991; A61B 2017/00407; A61C 1/082
See application file for complete search history.

(56) References Cited

U.S. PATENT DOCUMENTS

| | | |
|---|---|---|
| 2005/0234304 A1 | 10/2005 | Dewey et al. |
| 2007/0089752 A1 | 4/2007 | Christensen, III |
| 2012/0012120 A1 | 1/2012 | Giffey et al. |
| 2012/0046536 A1 | 2/2012 | Cheung et al. |
| 2013/0046147 A1 | 2/2013 | Nichter et al. |
| 2014/0272773 A1 | 9/2014 | Merritt et al. |
| 2014/0275803 A1* | 9/2014 | Cushner .................. A61B 1/32 600/238 |
| 2015/0087918 A1 | 3/2015 | Vasan |
| 2015/0133956 A1 | 5/2015 | Dayan et al. |
| 2015/0140506 A1 | 5/2015 | Motamedi |
| 2016/0166174 A1 | 6/2016 | Daon et al. |
| 2016/0310233 A1* | 10/2016 | Grande .................. A61C 1/084 |
| 2017/0348055 A1 | 12/2017 | Salcedo et al. |
| 2018/0014914 A1 | 1/2018 | Raghavan et al. |
| 2018/0228359 A1 | 8/2018 | Meyer et al. |
| 2019/0099236 A1 | 4/2019 | Jin et al. |

FOREIGN PATENT DOCUMENTS

| | | |
|---|---|---|
| WO | 2004/100767 A2 | 11/2004 |
| WO | 2012026981 A1 | 3/2012 |
| WO | WO 2015/103613 | 7/2015 |
| WO | WO 2015/175635 | 11/2015 |
| WO | 2016110855 A1 | 7/2016 |

* cited by examiner

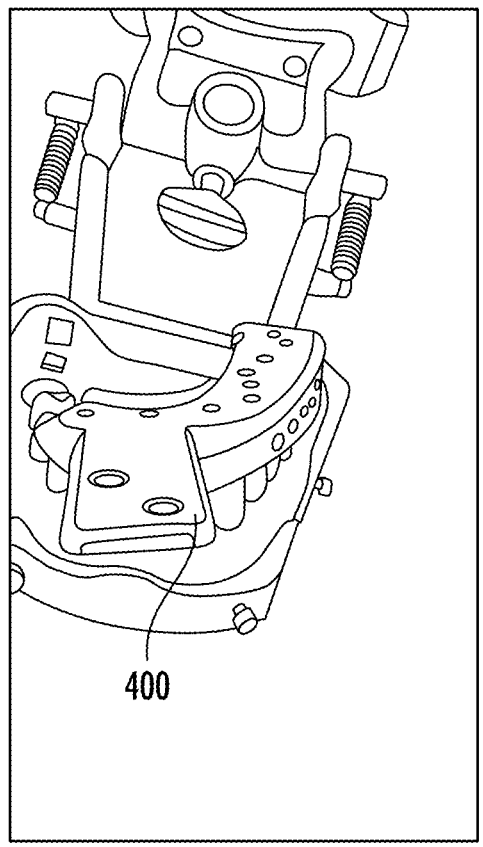
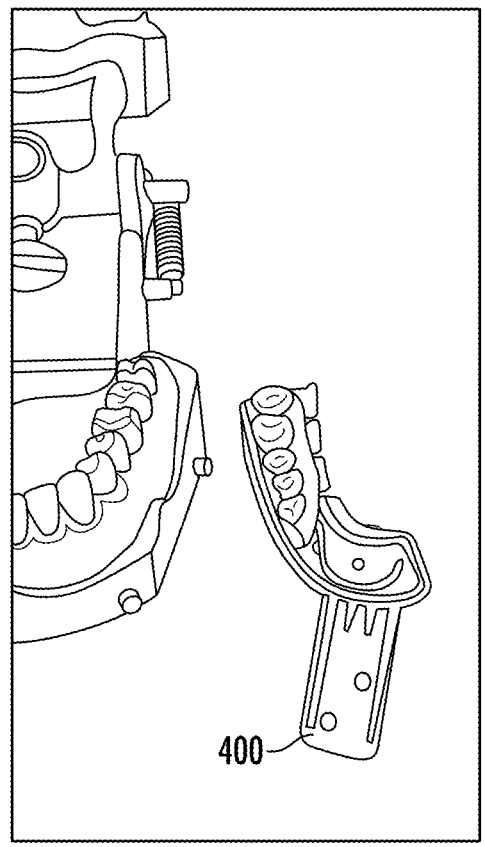
FIG. 2A
PRIOR ART
FIG. 2B
PRIOR ART

L  M  S

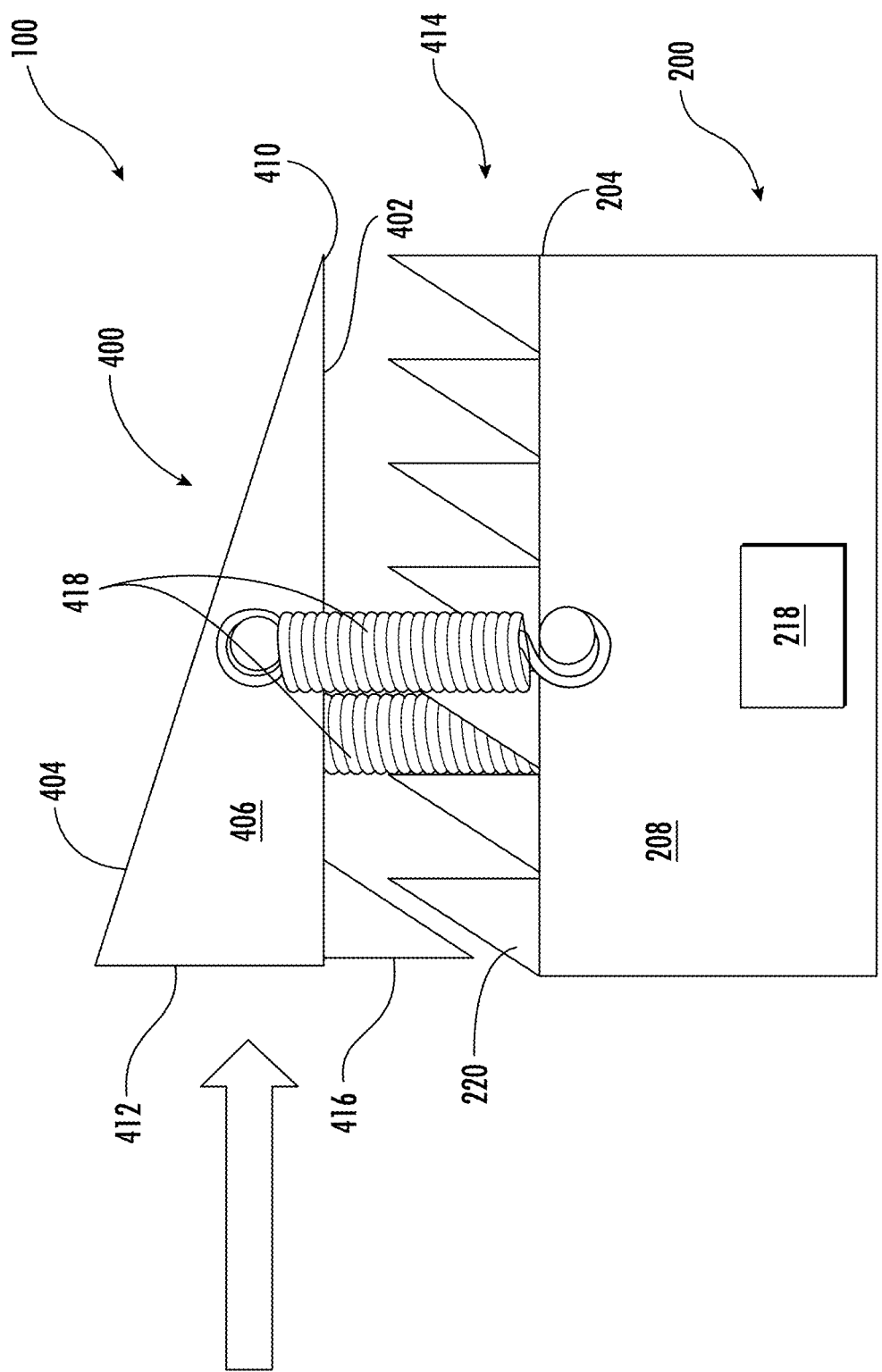

SPLINT DEVICE FORMING A FIDUCIAL MARKER CO- OPERABLE WITH A GUIDANCE SYSTEM OF A ROBOT

CROSS-REFERENCE TO RELATED APPLICATIONS

This application is a national stage filing under 35 U.S.C. 371 of PCT/IB2020/056977, filed Jul. 23, 2020, which International Application was published by the International Bureau in English on Jan. 28, 2021, as WO 2021/014408, and application claims priority from U.S. Provisional Patent Application No. 62/878,240, filed on Jul. 24, 2019, which applications are hereby incorporated by reference in their entirety in this application.

BACKGROUND

Field of the Disclosure

The present application relates to surgical robots and associated guidance systems and, more particularly, to a splint device forming a fiducial marker co-operable with a guidance system of a robot.

Description of Related Art

Robotic systems are being increasingly implemented in surgical applications. Such robots are often associated with a guidance system used to guide a surgical instrument implemented by the surgical robot. The guidance system may also be configured to be involved in the surgical pre-planning process, whether by being involved in gathering and/or analyzing patient data, and planning the surgical procedure, or by relying upon pre-planning data to guide the surgical instrument to conduct the surgical procedure.

In particular surgical procedures, some surgical robotic systems rely upon a fixed reference point associated with the patient's body for guiding the surgical robot. That is, some such surgical robotic systems define a frame of reference with respect to the patient's body so as to account or otherwise compensate for movements or motion of the patient during the procedure, whether during pre-planning or during the actual surgical procedure itself. This reference point must also be repeatable such that multiple engagements/disengagements between the surgical robotic system and the patient's body (i.e., periods between pre-planning and the actual surgical procedure) do not change the frame of reference implemented by the surgical robot or the guidance system associated therewith.

In particular instances, the reference point (or the connection between the guidance system and the patient to define that reference point) implemented by the guidance system for the surgical robot may be accomplished through, for example, an optical modality, a mechanical modality, an acoustic modality, or other suitable and appropriate tracking/guiding modality, or any combination thereof. In some modalities, particularly used in dental surgery applications, one mechanical modality for forming the reference point (i.e., a "fiducial marker") may be accomplished, for example, by attaching/securing a rigid element to the object of interest (e.g., head/teeth of the patient). Such a rigid element, in some instances, may be referred to as and may comprise a splint (see, e.g., FIGS. 1, 2A, and 2B).

In some instances, such surgical procedures also rely on separators or retractors to separate edges of a pliable housing, the edge(s) defining an opening (e.g., a surgical incision or wound), or to hold back underlying objects within the pliable housing (e.g., organs and tissues) so that an object of interest within the pliable housing may be accessed through the opening. Differently sized and shaped separators or retractors may be utilized depending on the surgical procedure (see, e.g., FIGS. 3A and 3B). In some surgical procedures, it may be desirable to have one, two, three, four, etc., separators or retractors in order to access the object of interest within the pliable housing through the opening.

Typically, separators or retractors are provided separately from the fiducial marker (e.g., a splint). As such, accessibility of the fiducial marker for robotic guidance may be hampered by the physical impediment of the separators or retractors. Further, surgical workflow may be inefficient as the various separators and retractors may require positioning only after forming the fiducial marker with the patient's body and prior to the robotic guidance.

As such, there exists a need for a splint device forming a fiducial maker co-operable with a guidance system of a robot, which addresses these and other limitations of prior art devices.

SUMMARY OF THE DISCLOSURE

The above and other needs are met by aspects of the present disclosure which, in one particular aspect, provides a splint device co-operable with a guidance system of a robot, for example, for dental surgery. Such a device may comprise a splint body arranged to be fixedly coupled to a first object disposed within a pliable housing defining an opening. A retractor having a first portion is coupled to the splint body, and a second portion extends away from the splint body, the second portion being arranged to engage the pliable housing about the opening so as to retract and maintain the pliable housing away from the first object, and such that the first object is accessible through the opening.

Another aspect of the present disclosure provides a splint device co-operable with a guidance system of a robot, for example, for dental surgery. Such a device may comprise a splint body arranged to be fixedly coupled to a first object disposed within a pliable housing defining an opening. A spacer is engaged with the splint body, the spacer being arranged to cooperate with the splint body to separate a second object from the first object within the pliable housing.

The present disclosure thus includes, without limitation, the following example embodiments:

Example Embodiment 1: A splint device co-operable with a guidance system of a robot, the device comprising: a splint body arranged to be fixedly coupled to a first object disposed within a pliable housing defining an opening; and a retractor having a first portion coupled to the splint body, and a second portion extending away from the splint body, the second portion being arranged to engage the pliable housing about the opening so as to retract and maintain the pliable housing away from the first object, such that the first object is accessible through the opening.

Example Embodiment 2: The splint device of any preceding embodiment or any combination of preceding embodiments, wherein the splint body includes a laterally-extending medial portion having opposed lateral sides, and first and second stabilizing portions extending from the opposed lateral sides of the medial portion, the medial portion and the first and second stabilizing portions arranged to extend about the first object and to be affixed thereto.

Example Embodiment 3: The splint device of any preceding embodiment or any combination of preceding embodiments, the splint device comprising a spacer engaged with the medial portion of the splint body, the spacer being arranged to cooperate with the medial portion to separate a second object from the first object within the pliable housing.

Example Embodiment 4: The splint device of any preceding embodiment or any combination of preceding embodiments, wherein the retractor or the spacer is moveably coupled to the splint body.

Example Embodiment 5: The splint device of any preceding embodiment or any combination of preceding embodiments, the splint device comprising a first ratchet mechanism operably engaged between the retractor and the splint body, the first ratchet mechanism being arranged to variably retract the pliable housing from the first object.

Example Embodiment 6: The splint device of any preceding embodiment or any combination of preceding embodiments, the splint device comprising a second ratchet mechanism operably engaged between the spacer and the medial portion of the splint body, the second ratchet mechanism being arranged to variably separate the second object from the first object within the pliable housing.

Example Embodiment 7: A splint device co-operable with a guidance system of a robot, the device comprising: a splint body arranged to be fixedly coupled to a first object disposed within a pliable housing defining an opening; and a spacer engaged with the splint body, the spacer being arranged to cooperate with the splint body to separate a second object from the first object within the pliable housing.

Example Embodiment 8: The splint device of any preceding embodiment or any combination of preceding embodiments, the splint device comprising a retractor having a first portion coupled to the splint body, and a second portion extending away from the splint body, the second portion being arranged to engage the pliable housing about the opening so as to retract and maintain the pliable housing away from the first object, such that the first object is accessible through the opening.

Example Embodiment 9: The splint device of any preceding embodiment or any combination of preceding embodiments, wherein the splint body includes a laterally-extending medial portion having opposed lateral sides, and first and second stabilizing portions extending from the opposed lateral sides of the medial portion, with the medial portion and the first and second stabilizing portions arranged to extend about the object and to be affixed thereto, and wherein the spacer is engaged with the medial portion of the splint body.

Example Embodiment 10: The splint device of any preceding embodiment or any combination of preceding embodiments, wherein the retractor or the spacer is moveably coupled to the splint body.

Example Embodiment 11: The splint device of any preceding embodiment or any combination of preceding embodiments, the splint device comprising a first ratchet mechanism operably engaged between the retractor and the splint body, the first ratchet mechanism being arranged to variably retract the pliable housing from the object.

Example Embodiment 12: The splint device of any preceding embodiment or any combination of preceding embodiments, the splint device comprising a second ratchet mechanism operably engaged between the spacer and the medial portion of the splint body, the second ratchet mechanism being arranged to variably separate the second object from the first object within the pliable housing.

These and other features, aspects, and advantages of the present disclosure will be apparent from a reading of the following detailed description together with the accompanying drawings, which are briefly described below. The present disclosure includes any combination of two, three, four, or more features or elements set forth in this disclosure, regardless of whether such features or elements are expressly combined or otherwise recited in a specific embodiment description herein. This disclosure is intended to be read holistically such that any separable features or elements of the disclosure, in any of its aspects and embodiments, should be viewed as intended, namely to be combinable, unless the context of the disclosure clearly dictates otherwise.

It will be appreciated that the summary herein is provided merely for purposes of summarizing some example aspects so as to provide a basic understanding of the disclosure. As such, it will be appreciated that the above described example aspects are merely examples and should not be construed to narrow the scope or spirit of the disclosure in any way. It will be appreciated that the scope of the disclosure encompasses many potential aspects, some of which will be further described below, in addition to those herein summarized. Further, other aspects and advantages of such aspects disclosed herein will become apparent from the following detailed description taken in conjunction with the accompanying drawings which illustrate, by way of example, the principles of the described aspects.

BRIEF DESCRIPTION OF THE SEVERAL VIEWS OF THE DRAWING(S)

Figure 3A:
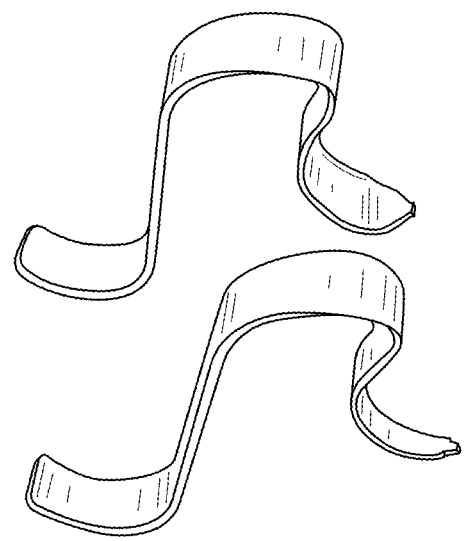
Figure 3B:
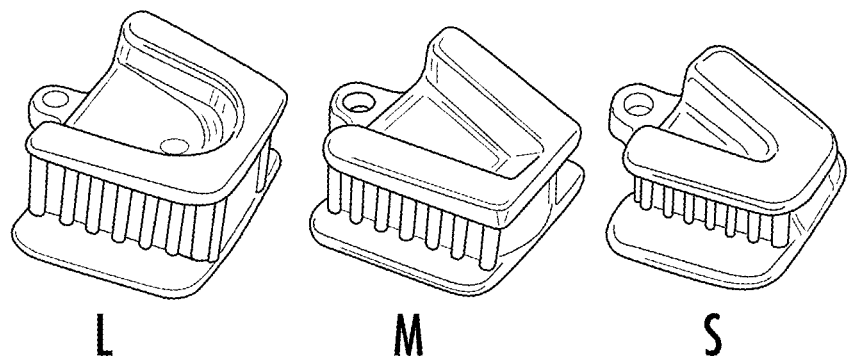
Figure 4:
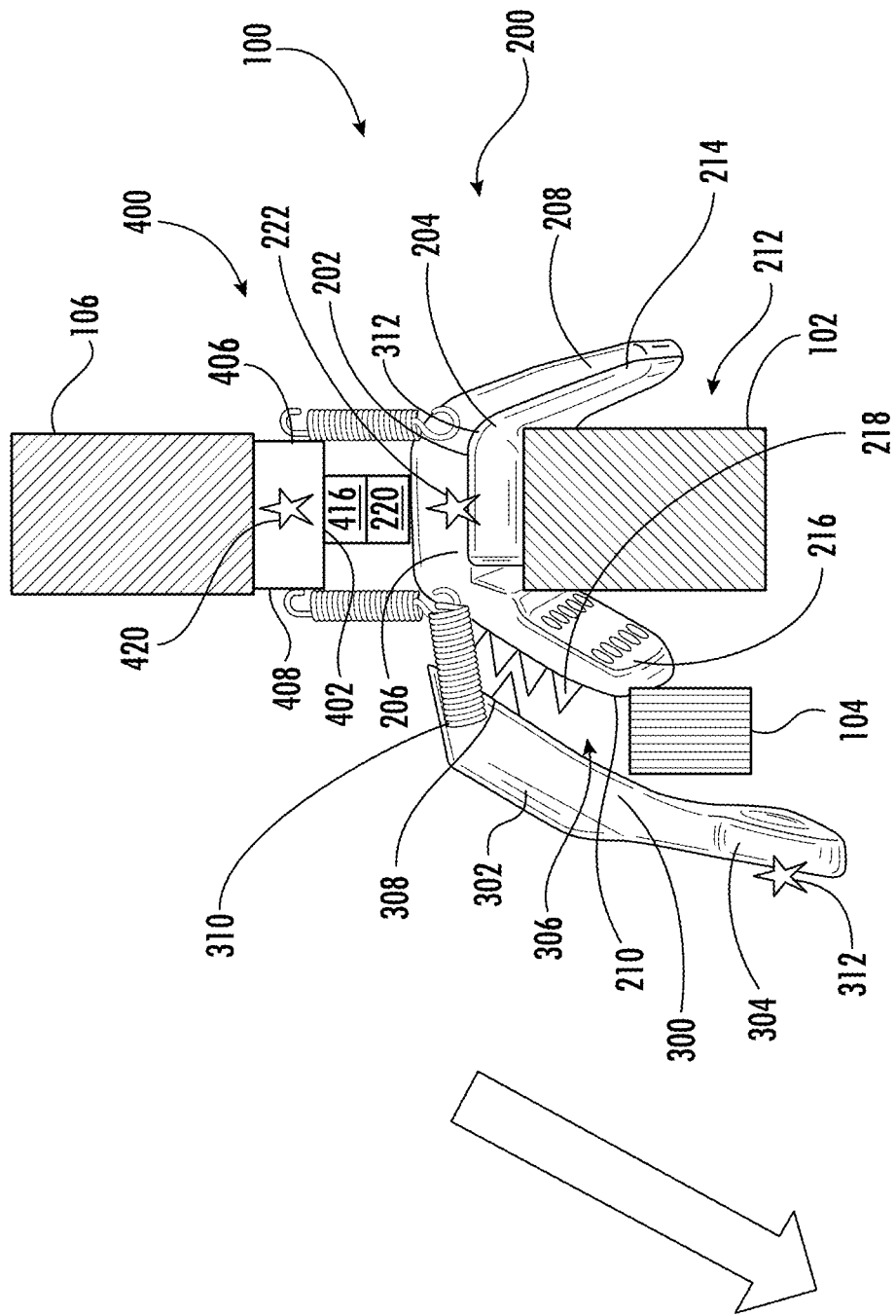
Figure 5:
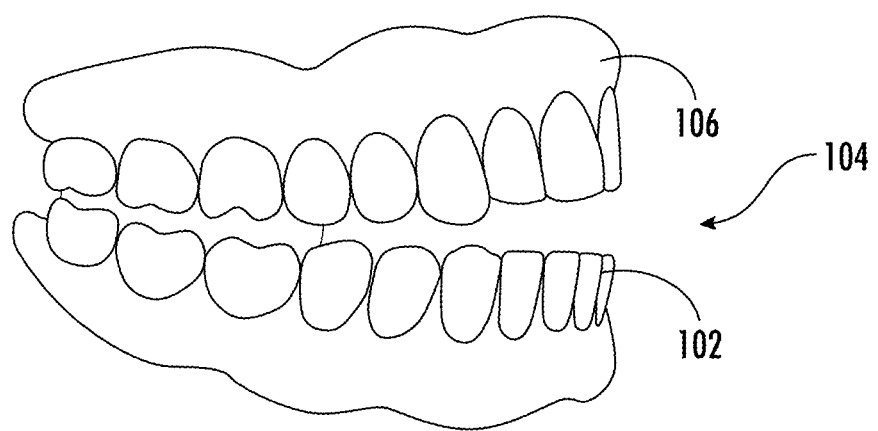

Having thus described the disclosure in general terms, reference will now be made to the accompanying drawings, which are not necessarily drawn to scale, and wherein:

FIG. 1 schematically illustrates a prior art splint device engaged with a representative model of a mouth of a patient so as to provide a fiducial marker and/or a tracking marker for a guidance system for a surgical robot for dental surgeries;

FIGS. 2A and 2B schematically illustrates a prior art splint device engaged with a representative model of a mouth of a patient so as to provide a fiducial marker and/or a tracking marker for a guidance system for a surgical robot for dental surgeries (FIG. 2A) and the prior art splint device disengaged from the representative model of the mouth of the patient (FIG. 2B);

FIGS. 3A and 3B illustrate a prior art retractor for knee surgery (FIG. 3A) and a prior art retractor for dental surgery (FIG. 3B);

FIG. 4 schematically illustrates a front view of a splint device forming a fiducial marker and/or tracking marker for cooperation with a guidance system for a robot and variably retracting a pliable housing from a first object such that the first object is accessible through an opening defined by the housing and variably separating a second object from the first object within the pliable housing, according to one aspect of the present disclosure;

FIG. 5 schematically illustrates an example pliable housing defining an opening and having a first object and a second object disposed within the pliable housing, according to one aspect of the present disclosure; and FIG. 6 schematically illustrates a side view of a splint device forming a fiducial marker and/or tracking marker for a guidance system for a robot and coupling devices for variably retracting a pliable housing from a first object such that the first object is accessible through an opening defined by the pliable housing and variably separating a second object from the first object within the pliable housing, according to one aspect of the present disclosure.

DETAILED DESCRIPTION OF THE DISCLOSURE

The present disclosure now will be described more fully hereinafter with reference to the accompanying drawings, in which some, but not all aspects of the disclosure are shown. Indeed, the disclosure may be embodied in many different forms and should not be construed as limited to the aspects set forth herein; rather, these aspects are provided so that this disclosure will satisfy applicable legal requirements. Like numbers refer to like elements throughout.

Particular aspects of the present disclosure, as shown, for example, in FIG. 4 provide a splint device 100 co-operable with a guidance system of a surgical robot, for instance, for dental surgery. One skilled in the art, however, will appreciate that the concept of the splint device disclosed herein as forming a fiducial marker and/or a tracking marker, or otherwise a frame of reference for a surgical robotic system, with a variable retractor and/or spacer may find applicability to other surgical processes not involving dental surgery, such as, for example, orthopedic surgery (e.g., knee surgery), ENT surgery, and neurosurgery. As such, the aspects of the disclosure presented herein are merely examples of the applicability of the disclosed concepts and are not intended to be limiting in any manner.

Such a splint device 100 may comprise, for example, a splint body 200 fixedly coupled to a first object 102 disposed within a pliable housing 104 defining an opening. As used herein, a "pliable housing defining an opening" refers to a pliable (i.e., flexible, moveable) housing defining an operatively moveable and variable aperture that, when the pliable housing is operatively moved such that the opening/aperture expands into an open position, the opening/aperture provides access to an interior chamber within the housing. For example, and as illustrated in FIG. 5, for example, the pliable housing defining an opening/aperture may comprise a mouth of a patient or a model of a mouth of a patient having teeth/gums/jaw within the housing that may be accessible through the opening/aperture when the mouth is in an open position. In another example, the pliable housing defining an opening/aperture may comprise a patient's body or part thereof in which an incision is made and the underlying tissues, bones, muscles, etc., are accessible through the opening/aperture when the incision is in an open position, e.g., a knee distraction. As contemplated herein, the splint device may also be utilized in any type of non-surgical pliable housing defining an opening.

Likewise, an "object" as used herein, refers to a physical structure within the pliable housing that may be capable of having the splint body 200 coupled thereto. In some instances, it may be desirable to variably separate objects disposed within the pliable housing 104. In such instances, a first object 102 may be variably separated from a second object 106 in order to facilitate access to another object disposed within the pliable housing through the opening and/or to the first and/or second object. For example, and as illustrated in FIG. 5, the first object comprises the teeth on the lower jaw, while the second object comprises the teeth on the upper jaw. In this example, a third object such as a tongue and/or one or more of the teeth on the lower jaw and/or the teeth on the upper jaw may be accessed through the mouth opening. In another example, the first object may comprise tissues, bones, muscles, or the like underlying an incision and the second object may comprise other tissues, bones, muscles, or the like.

Referring back to FIG. 4, the splint body 200 may comprise, for example, a laterally-extending medial portion 202 having opposed lateral sides 204, 206, and first and second stabilizing portions 208, 210 extending from the opposed lateral sides of the medial portion. The medial portion 202 and the first and second stabilizing portions thereby cooperate to form a splint body defining a longitudinally-extending U-channel 212 therein. In some aspects, the first and second stabilizing portions are engaged with the medial portion so as to be generally opposed to and laterally spaced from each other. As such, the inner surfaces 214, 216 of the first and second stabilizing portions are generally opposed to and laterally spaced apart from each other, and cooperate with the medial portion to define the U-channel. The U-channel may generally be in the form of, for example, an upward-facing "U" shaped channel or an inverted, downward facing "U" shaped channel, as appropriate or desirable for fixedly coupling or mounting, for example, to an object (e.g., mouth/teeth/jaw of a patient) disposed within a pliable housing. For example, an inverted "U" shaped channel may be fixedly coupled to the first object 102 (e.g., lower jaw or lower teeth of a patient), while a "U" shaped channel may be fixedly coupled to the second object 106 (e.g., upper jaw or upper teeth of a patient).

The U-channel 212 may extend lengthwise, for example, over the first object 102 (e.g., one tooth or over a plurality of teeth or along a portion of a jaw in the mouth of the patient). In some aspects of the present disclosure, the splint device 100, including the splint body 200, may cooperate to perform a similar function as associated with prior art splint devices. More particularly, the U-channel may be further configured to receive an adhesive material therein so as to facilitate engagement with and adherence to an object such as, for example, the tooth/teeth or jaw of a patient. In this manner, the splint body 200 may be fixedly coupled to an object such as the first object 102 or the second object 106.

In some aspects, a retractor 300 may be coupled to or otherwise engaged with the splint body 200 and, in particular aspects, the retractor may be further configured to extend outwardly away from the splint body and outwardly from the U-channel 212. The retractor may comprise a first portion 302 coupled to or otherwise engaged with the splint body and a second portion 304 extending away from the splint body. As such, when the splint body is fixedly coupled to the first object 102 disposed within the pliable housing 104, the first or second portion of the retractor may be arranged to engage the pliable housing about the opening define thereby so as to retract and maintain the pliable housing from the first object, and such that the first object is accessible through the opening.

The retractor 300 may comprise a curved, hooked, or angled blade that is capable of self-retaining (i.e., does not need to be held) once the retractor engages the pliable housing about the opening. The retractor may comprise a size or shape that may vary depending on the type of pliable housing that the retractor is engaged with. For example, the retractor may comprise a Holmann retractor as illustrated in FIG. 3A.

In some aspects, the splint device 100 also comprises a spacer 400 engaged with the medial portion 202 of the splint body 200. The spacer may be arranged to cooperate with the medial portion to separate the second object 106 from the first object 102 within the pliable housing 104. The spacer may comprise a first portion 402 that is engageable with the medial portion of the splint body and an opposing second portion 404 (FIG. 6) that is engageable with the second object. Opposed lateral sides 406, 408 may extend between the first portion and the second portion. As such, when the splint body is fixedly coupled to the first object disposed within the pliable housing 104, the first portion of the spacer is arranged to cooperate with the medial portion and the opposing second portion of the spacer is arranged to engage the second object so as to separate the second object from the first object within the pliable housing. As such, the spacer may be provided instead of or in addition to the retractor 300, depending on the application in which the splint device is utilized.

The spacer 400 may comprise a size or shape that may vary depending on the type of pliable housing 104 and/or object that the spacer is engaged with in order to provide separation between the first object 102 and the second object 106 disposed within a pliable housing. The shape of the spacer may be one that corresponds to the pliable housing and/or object that the spacer is engaged with, in order to comfortably engage the second object. For example, the spacer may comprise a bite block, as illustrated in FIG. 3B. In some other aspects, for example, the spacer 400 may comprise a shape that is capable of comfortably separating a lower jaw from an upper jaw in a patient. More particularly, for example and as illustrated in FIG. 6, the opposing lateral sides 406, 408 (not shown in FIG. 6) of the spacer may be tapered such that the first portion and the opposing second portion of the spacer converge at a rear portion 410. As such a height of a front portion 412 of the spacer may be greater than a height of the rear portion.

In some aspects, the retractor 300 and/or the spacer 400 may be moveably coupled to the splint body 200. Where the splint device 100 includes both the retractor and the spacer, one or both of the retractor and the spacer may be moveably coupled to the splint body. Otherwise, the retractor and/or the spacer may be fixedly coupled to the splint body, such that the retractor or the spacer is in a fixed position once engaged with the splint body. As used herein, moveably coupled is defined as being variably positioned, such that the retractor and/or the spacer are variably positionable relative to the splint body.

The retractor 300 may be coupled to the splint body 200 using a coupling device that allows the retractor to be either fixedly coupled or moveably coupled to the splint body. For fixed coupling, the coupling mechanism may comprise an adhesive, a screw, or the like to fix the retractor in a single position relative to the splint body. For moveable coupling, the coupling device may comprise a ratchet mechanism, a crank mechanism, and the like to variably fix the retractor in one or more positions relative to the splint body.

For example, and as illustrated in FIG. 4, the retractor 300 is moveably coupled to the splint body 200 using a first ratchet mechanism 306. More particularly, the first ratchet mechanism may comprise a pawl 308 disposed on the first portion 302 of the retractor. The pawl may be configured to engage one or more teeth 218 disposed on the splint body, e.g., on the first stabilizing portion 208 or the second stabilizing portion 210. The one or more teeth may be uniform, but asymmetrical, with each tooth having a moderate slop on one edge and a much steeper slope on the other edge. When the retractor is moved downward (i.e., in the forward direction), the pawl may be able to easily slide up and over the gently sloped edges of the teeth. A biasing mechanism 310, such as a tension spring, may be coupled to both the retractor and the splint body. Accordingly, the biasing mechanism may extend from its initial position when the retractor is moved downward, such that a tension force may force the pawl into a depression as formed between each of the teeth as it passes the tip of each tooth. If the retractor is moved upward (i.e., in the backward direction), the pawl moves in the opposite (backward) direction, such that the pawl will catch against the steeply sloped edge of the first tooth it encounters, thereby locking it against the tooth and preventing any further motion in that direction.

In this manner, the retractor 300 may be moved downward to variably retract the pliable housing 104 from the first object 102 such that the first object is accessible through the opening defined by the housing. The farther the retractor is moved, the more the pliable housing will be retracted from the first object about the opening. One skilled in the art will appreciate, however, that the retractor may be moveably coupled to the splint body in other manners.

The spacer 400 may be coupled to the splint body 200 using a coupling device that allows the spacer to be either fixedly coupled or moveably coupled thereto. For fixed coupling, the coupling mechanism may comprise an adhesive, a screw, or the like to fix the spacer in a single position relative to the splint body. For moveable coupling, the coupling device may comprise a ratchet mechanism, a crank mechanism, and or like to variably fix the spacer in one or more positions relative to the splint body.

For example, and as illustrated in FIG. 6, the spacer 400 is moveably coupled to the splint body 200 using a second ratchet mechanism 414. More particularly, the second ratchet mechanism may comprise a pawl 416 disposed on the first portion 402 of the spacer mechanism. The pawl may be configured to engage one or more teeth 220 disposed on the laterally-extending medial portion 202 of the splint body. The one or more teeth 220 may be uniform, but asymmetrical, with each tooth having a moderate slop on one edge and a much steeper slope on the other edge. When the spacer is moved towards a rear of the pliable housing defining the opening (e.g., in the forward direction relative to the moderate slope of the teeth), the pawl may be able to easily slide up and over the moderately sloped edges of the teeth. A biasing mechanism 418, such as a tension spring, may be coupled to both the spacer and the splint body. For example, and as illustrated in FIG. 6, there may be two tension springs, one of each disposed on the opposed lateral sides 406, 408 of the spacer and extending to the stabilizing portions 208, 210 of the spacer.

Accordingly, the biasing mechanism 418 may extend from its initial position when the spacer 400 is moved backward, such that a tension force may force the pawl into a depression as formed between each of the teeth 220 as it passes the tip of each tooth. If the spacer is moved towards a front of the pliable housing defining the opening (e.g., in the backward direction relative to the moderate slope of the teeth), the pawl will catch against the steeply sloped edge of the first tooth it encounters, thereby locking it against the tooth and preventing any further motion in that direction. In this manner, the spacer may be moved backward to variably separate the second object 106 from the first object 102 within the pliable housing 104. The farther back the spacer is moved relative to the laterally-extending medial portion 202, the more the second object will be separated from the first object. One skilled in the art will appreciate, however, that the spacer may be moveably coupled to the splint body in other manners.

In some aspects, the splint body 200, retractor 300, and/or the spacer 400 the may comprise an attachment point 222, 312, 420, respectively, for engagement with a tracking portion (or tracking arm or other tracking provision) associated with the guidance system for the surgical robot (i.e., wherein, for instance, reflective markers may be mounted to the attachment point for optical tracking of the fiducial marker or the splint device 100 itself, or the attachment point may include a securing site for forming a mechanical connection therewith for mechanical tracking of a reference point or "fiducial marker", or the attachment point may otherwise be configured to receive an appropriate element associated with any other suitable tracking arrangement for the fiducial marker). For example, the first or second portion 302, 304 of the retractor be configured or otherwise arranged to function as a fixed mounting site for particular tracking devices such as, for example, one or more markers that may be permanently affixed to the first or second portion of the retractor and configured to be trackable by an optical-type tracking device (i.e., an optical tracking marker).

As illustrated in FIG. 4, for example, the second portion 304 of the retractor 300 comprises the attachment point 312 such that particular tracking devices may be attached thereto or one or more markers may be permanently affixed thereon. FIG. 4 also illustrates an example location of an attachment point 222 on the splint body 200 such that particular tracking devices may be attached thereto or one or more markers may be permanently affixed thereon. For example, the attachment point may be provided on the laterally-extending medial portion 202. FIG. 4 further illustrates an example location of an attachment point 420 on the spacer 400 such that particular tracking devices may be attached thereto or one or more markers may be permanently affixed thereon. For example, the attachment point may be provided on the front portion 412.

Many modifications and other embodiments of the inventions set forth herein will come to mind to one skilled in the art to which these disclosed embodiments pertain having the benefit of the teachings presented in the foregoing descriptions and the associated drawings. For example, the splint device 100 may be able to serve as a fiducial marker while also simultaneously retracting and/or separating a pliable housing 104 from an object 102, 206 disposed within, and/or separating two or more objects within the pliable housing in preparation for robotic guidance through the opening defined by the pliable housing. As such, registration and calibration of an instrument for interacting with the splint device may be accomplished after the splint device has been engaged with the object(s) and/or the pliable housing and then robotic guidance using the fiducial marker may begin without re-positioning of various separators and retractors, as the fiducial marker and the object(s) of interest may be already accessible in relation to the splint device. In this manner, for example, steps in a workflow may be decreased.

Therefore, it is to be understood that embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the disclosure. In this regard, for example, different combinations of elements and/or functions than those explicitly described above are also contemplated within the scope of the disclosure. Although specific terms are employed herein, they are used in a generic and descriptive sense only and not for purposes of limitation.

It should be understood that although the terms first, second, etc. may be used herein to describe various steps or calculations, these steps or calculations should not be limited by these terms. These terms are only used to distinguish one operation or calculation from another. For example, a first calculation may be termed a second calculation, and, similarly, a second step may be termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

That which is claimed:

1. A splint device co-operable with a guidance system of a robot and adapted to be applied to a first object disposed within a pliable housing defining an opening, the splint device comprising:
    a splint body arranged to be fixedly coupled to the first object; and
    a retractor having a first portion coupled to the splint body, a second portion extending away from the splint body, and a first ratchet mechanism operably engaged between the first and second portions of the retractor, the second portion being arranged to engage the pliable housing about the opening such that the second portion and the first ratchet mechanism variably separate and maintain the pliable housing away from the first object.

2. The splint device of claim 1, wherein the splint body, in cross-section, includes a laterally-extending medial portion having opposed lateral sides, and first and second stabilizing portions extending from the opposed lateral sides of the medial portion, the medial portion and the first and second stabilizing portions arranged to extend about the first object and to be affixed thereto.

3. The splint device of claim 1, comprising a spacer engaged with the splint body, the spacer being adapted to interact with a second object to separate and maintain the second object away from the first object.

4. The splint device of claim 3, wherein the retractor or the spacer is moveably coupled to the splint body.

5. The splint device of claim 3, comprising a second ratchet mechanism operably engaged between the spacer and the splint body, the second ratchet mechanism being arranged to variably separate and maintain the second object away from the first object.

6. A splint device co-operable with a guidance system of a robot and adapted to be applied to a first object disposed within a pliable housing defining an opening, the splint device comprising:
    a splint body arranged to be fixedly coupled to the first object;
    a spacer movably coupled to the splint body, the spacer being a bite block engaged with the splint body so as to be disposed between the splint body and a second object, and adapted to interact with the second object to separate and maintain the second object away from the first object; and a second ratchet mechanism operably engaged between the spacer and the splint body, the second ratchet mechanism being arranged to variably separate the second object from the first object.

7. The splint device of claim 6, comprising a retractor having a first portion coupled to the splint body, and a second portion extending away from the splint body, the second portion being arranged to engage the pliable housing about the opening such that the second portion of the retractor separates and maintains the pliable housing away from the first object.

8. The splint device of claim 7, wherein the retractor is moveably coupled to the splint body.

9. The splint device of claim 8, comprising a first ratchet mechanism operably engaged between the first and second portions of the retractor, the second portion of the retractor and the first ratchet mechanism being arranged to variably separate and maintain the pliable housing away from the first object.

10. The splint device of claim 6, wherein the splint body includes a laterally-extending medial portion having opposed lateral sides, and first and second stabilizing portions extending from the opposed lateral sides of the medial portion, with the medial portion and the first and second stabilizing portions arranged to extend about the first object and to be affixed thereto.

* * * * *